United States Patent
Tsujiuchi et al.

(10) Patent No.: US 10,906,221 B2
(45) Date of Patent: Feb. 2, 2021

(54) MANUFACTURING METHOD OF LIQUID SUPPLY MEMBER

(71) Applicant: CANON KABUSHIKI KAISHA, Tokyo (JP)

(72) Inventors: Naoko Tsujiuchi, Kawasaki (JP); Yukuo Yamaguchi, Tokyo (JP); Mikiya Umeyama, Tokyo (JP); Satoshi Oikawa, Yokohama (JP); Hiromasa Amma, Kawasaki (JP); Takuya Iwano, Inagi (JP); Satoshi Kimura, Kawasaki (JP); Yasushi Iijima, Tokyo (JP); Kyosuke Toda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 348 days.

(21) Appl. No.: 15/649,482

(22) Filed: Jul. 13, 2017

(65) Prior Publication Data
US 2018/0029267 A1 Feb. 1, 2018

(30) Foreign Application Priority Data
Jul. 29, 2016 (JP) .................................. 2016-149862

(51) Int. Cl.
*B29C 45/16* (2006.01)
*B29C 45/00* (2006.01)
(Continued)

(52) U.S. Cl.
CPC ...... *B29C 45/1635* (2013.01); *B29C 45/0062* (2013.01); *B29C 45/34* (2013.01);
(Continued)

(58) Field of Classification Search
CPC ........ B29C 2045/0063; B29C 45/0062; B29C 45/1635; B29C 45/34; B29C 44/1219;
(Continued)

(56) References Cited

U.S. PATENT DOCUMENTS

| 4,990,077 A * | 2/1991 | Morita ................ B29C 45/1635 425/130 |
| 2010/0171798 A1* | 7/2010 | Yamaguchi .......... B41J 2/16532 347/85 |

(Continued)

FOREIGN PATENT DOCUMENTS

JP 2002-178538 A 6/2002

OTHER PUBLICATIONS

Iijima et al., U.S. Appl. No. 15/631,120, filed Jun. 23, 2017.
Tsujiuchi et al., U.S. Appl. No. 15/649,472, filed Jul. 13, 2017.

*Primary Examiner* — Matthew J Daniels
*Assistant Examiner* — Yunju Kim
(74) *Attorney, Agent, or Firm* — Venable LLP

(57) ABSTRACT

There is provided a manufacturing method of a liquid supply member capable of suppressing decrease in sealing property of a liquid supply path and deformation of the liquid supply path or the external shape. For that purpose, a manufacturing process of a liquid supply member prevents inflow of a molten resin into a concave portion of a portion other than a liquid supply flow path in a liquid supply member.

5 Claims, 13 Drawing Sheets

(51) Int. Cl.
*B29C 45/34* (2006.01)
*B41J 2/175* (2006.01)
*B29L 31/00* (2006.01)

(52) U.S. Cl.
CPC ............. *B41J 2/175* (2013.01); *B41J 2/1752* (2013.01); *B41J 2/1753* (2013.01); *B41J 2/17523* (2013.01); *B29C 2045/0063* (2013.01); *B29L 2031/7678* (2013.01)

(58) Field of Classification Search
CPC ...... B29C 2045/1687; B29L 2031/7678; B41J 2/175; B41J 2/1752; B41J 2/17523; B41J 2/1753; B41J 2/16532
USPC .............................. 264/255; 347/85; 425/130
See application file for complete search history.

(56) References Cited

U.S. PATENT DOCUMENTS

| | | |
|---|---|---|
| 2016/0346967 A1 | 12/2016 | Oikawa et al. |
| 2016/0346968 A1 | 12/2016 | Kimura et al. |
| 2016/0346969 A1 | 12/2016 | Toda et al. |
| 2016/0346970 A1 | 12/2016 | Oikawa et al. |
| 2016/0346976 A1 | 12/2016 | Tsujiuchi et al. |
| 2016/0347066 A1 | 12/2016 | Amma et al. |
| 2016/0347072 A1 | 12/2016 | Iwano et al. |
| 2017/0197345 A1* | 7/2017 | Okamoto ............ B29C 44/1219 |

* cited by examiner

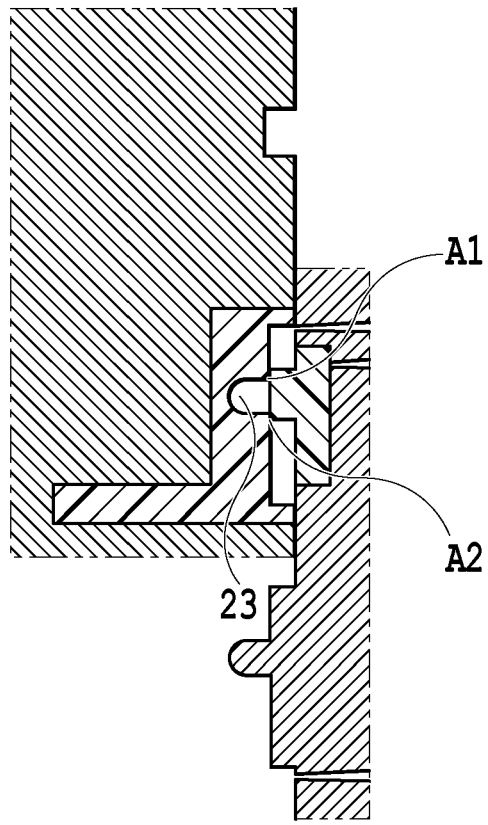
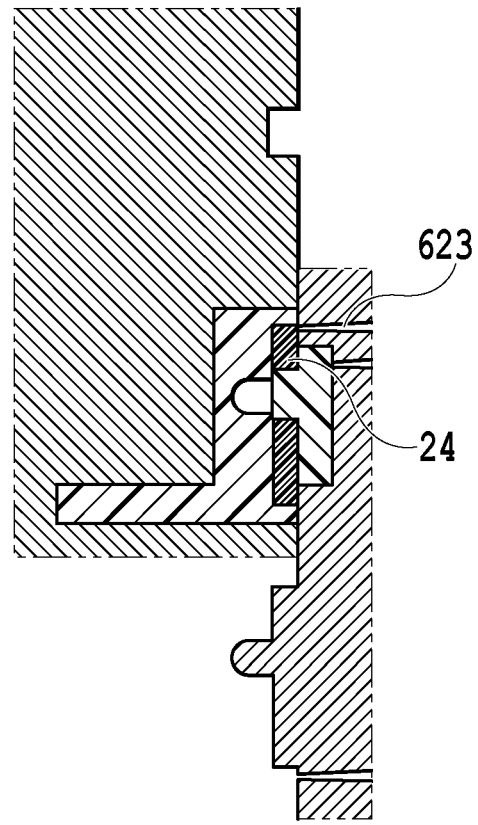
FIG.4A  FIG.4B
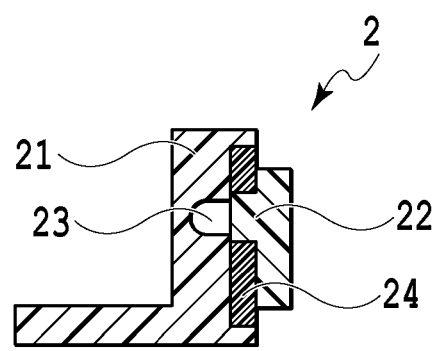
FIG.4C

MANUFACTURING METHOD OF LIQUID SUPPLY MEMBER

BACKGROUND OF THE INVENTION

Field of the Invention

The present invention relates to a liquid supply member for use in a liquid ejection head that ejects liquid, the liquid supply member having liquid supply paths formed therein, and a manufacturing method of a liquid supply member.

Description of the Related Art

A liquid supply member for use in a liquid ejection head that ejects liquid such as ink is formed with a plurality of liquid supply paths bent therein in order to supply a plurality of types of liquid. Generally, a liquid supply member having such liquid supply paths includes a combination of a plurality of components that is injection molded by the use of a resin material, from the viewpoint of ease of manufacturing, lightness, corrosion resistance, and the like. For example, the plurality of components is separately injection-molded, and then is assembled by supersonic welding, adhesion using an adhesive material, or the like.

Japanese Patent Laid-Open No. 2002-178538 discloses a manufacturing method (die-slide injection molding) capable of injection molding a plurality of components and joining these components in a same die, as a manufacturing method of a hollow body having a hollow portion therein.

In the case of manufacturing a liquid supply member having liquid supply paths formed inside according to the method of Japanese Patent Laid-Open No. 2002-178538, it is possible to set joining precision of the plurality of components to the same degree as dimensional precision of a single component, by molding and joining a plurality of components constituting the liquid supply member, in the same die.

A liquid supply member for use in a liquid ejection head may have a complicated shape with liquid supply paths densely arranged therein in order to suppress the size of the liquid ejection head to be small. In such a case, with the method of Japanese Patent Laid-Open No. 2002-178538, there is a possibility that the shape of a region into which a molten resin is poured for joining parts may become complicated, and a predetermined region cannot be completely filled with the molten resin, thereby leaving air bubbles therein. In such a case, there is a concern that movement of the remaining air bubbles may decrease the sealing property of the liquid supply path, or expansion the air bubble may lead to deformation of the supply path or the external shape.

SUMMARY OF THE INVENTION

Accordingly, the present invention provides a manufacturing method of a liquid supply member capable of suppressing decrease in sealing property of a liquid supply path and deformation of the liquid supply path or the external shape.

Therefore, a manufacturing method of a liquid supply member according to the present invention includes a primary molding process of molding, at different positions in a same die, a first member including a concave portion and a groove portion that causes liquid to flow, and a second member having a lid portion capable of closing a lid of the groove portion in combination with the first member; and a secondary molding process of connecting the first member and the second member with a molten resin by relatively moving a first pattern and a second pattern of the die to thereby cause the first member and the second member to face each other and by molding the first member and the second member in an overlapped manner, wherein the secondary molding process includes an inflow prevention process of preventing inflow of the molten resin into the concave portion provided at a position different from the groove portion in the first member.

According to the present invention, it is possible to realize a manufacturing method of a liquid supply member capable of suppressing decrease in sealing property of a liquid supply path and deformation of the liquid supply path or the external shape.

Further features of the present invention will become apparent from the following description of exemplary embodiments with reference to the attached drawings.

BRIEF DESCRIPTION OF THE DRAWINGS

FIG. 4A is a diagram illustrating a third process in manufacturing of a liquid supply member;

FIG. 4B is a diagram illustrating a fourth process in manufacturing of a liquid supply member;

FIG. 4C is a diagram illustrating a liquid supply member taken out of a die;

DESCRIPTION OF THE EMBODIMENTS

Hereinafter, a first embodiment of the present invention will be described with reference to the drawings.

Figure 1A:
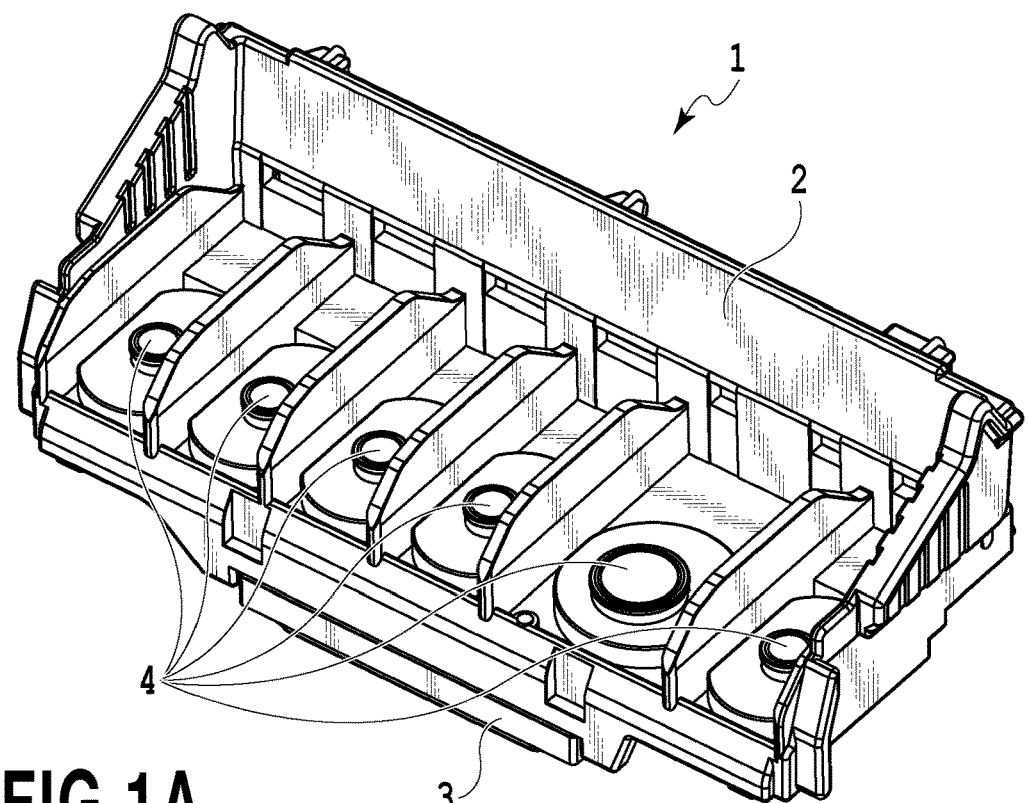
FIG. 1A is a perspective view illustrating a liquid ejection head including a liquid supply member.
Figure 1B:
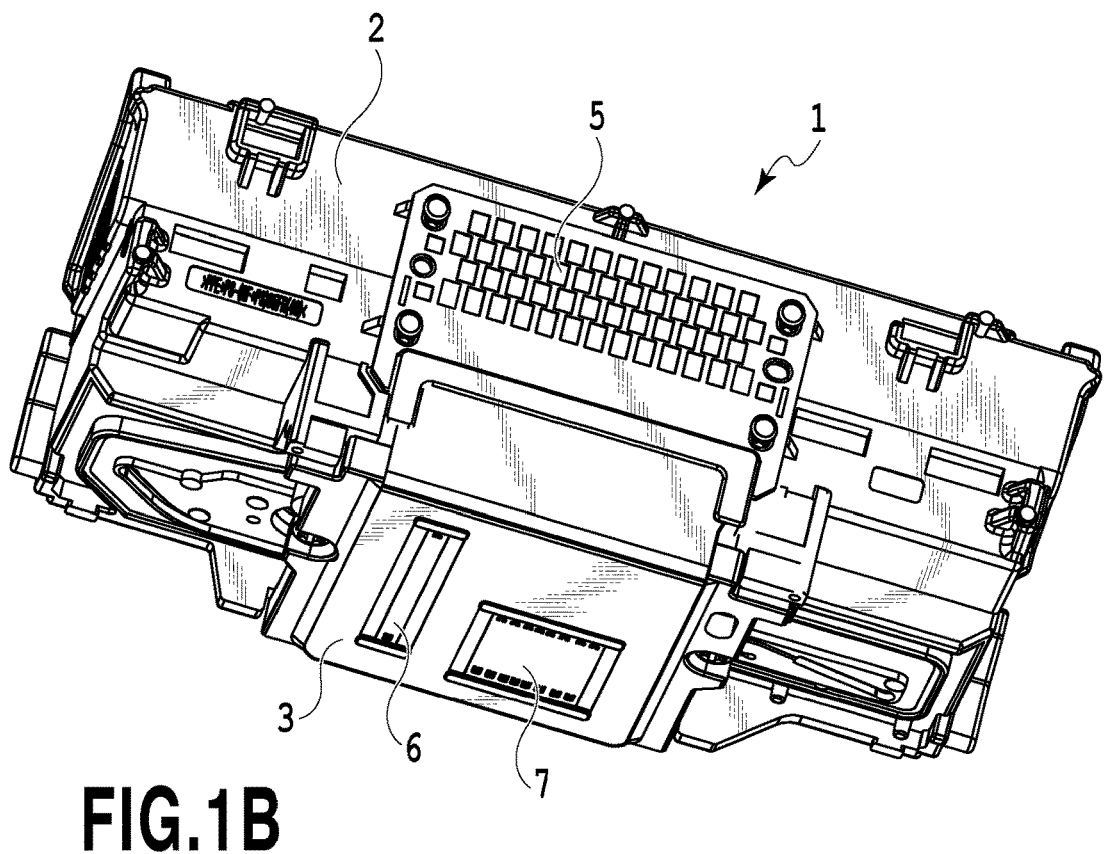
FIG. 1B is a perspective view illustrating a liquid ejection head including a liquid supply member.

FIGS. 1A and 1B are perspective views illustrating a liquid ejection head 1 including a liquid supply member according to the present embodiment. The liquid ejection head 1 that ejects liquid such as ink is mounted on a carriage of a liquid ejection apparatus represented by a so-called serial scan inkjet printing apparatus. Note that the liquid ejection head 1 may have a configuration of being arranged in a so-called full-line liquid ejection apparatus.

The liquid ejection head 1 includes a liquid supply member 2, an ejection element unit 3, and an electrical connection substrate 5. Liquid is supplied from an unillustrated liquid container to the ejection element unit 3 via connecting portions 4 of the liquid supply member 2 and a liquid supply path inside the liquid supply member 2. The ejection element unit 3 has a plurality of ejection ports capable of ejecting liquid arranged therein so as to form an unillustrated ejection port array, and each of the ejection ports is provided with an ejection energy-generating element such as an electric heat conversion element (heater) or a piezoelectric element. The ejection element unit 3 includes two printing element substrates 6 and 7, and a larger amount of liquid is supplied to the printing element substrate 6 than the printing element substrate 7.

The liquid ejection head 1 has a total of six types of liquids supplied thereto from six connecting portions 4, and each type of liquid is ejected from an ejection port array corresponding to each of the connecting portions 4. The liquid supply member 2 is formed with a liquid supply path communicating between the six connecting portions 4 and the ejection port array corresponding thereto. Since the adjacent space of the ports in the corresponding ejection port array is smaller than the adjacent space among the six connecting portions 4, there is also included a liquid flow path having a bent shape. Driving of the ejection energy-generating element by an unillustrated liquid ejection apparatus through the electrical connection substrate 5 is caused to eject liquid from the corresponding ejection port.

Figure 2A:
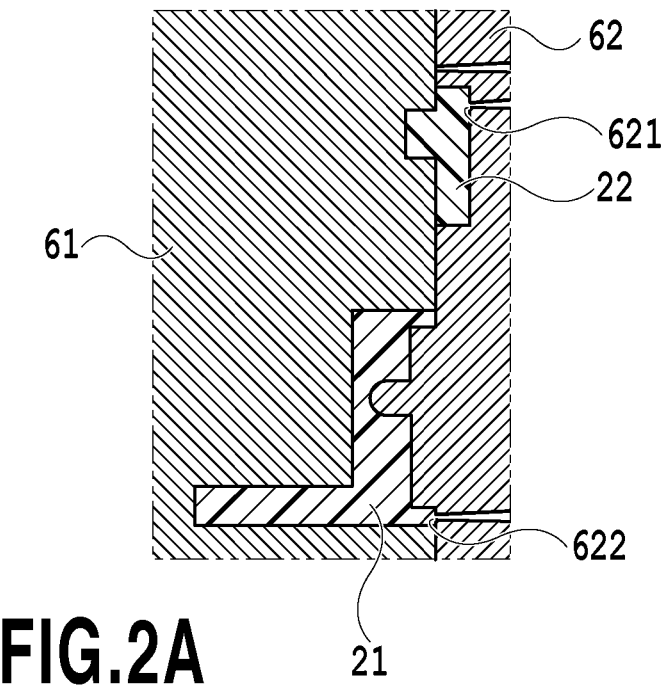
FIG. 2A is a diagram illustrating a first process in manufacturing of a liquid supply member.
Figure 2B:
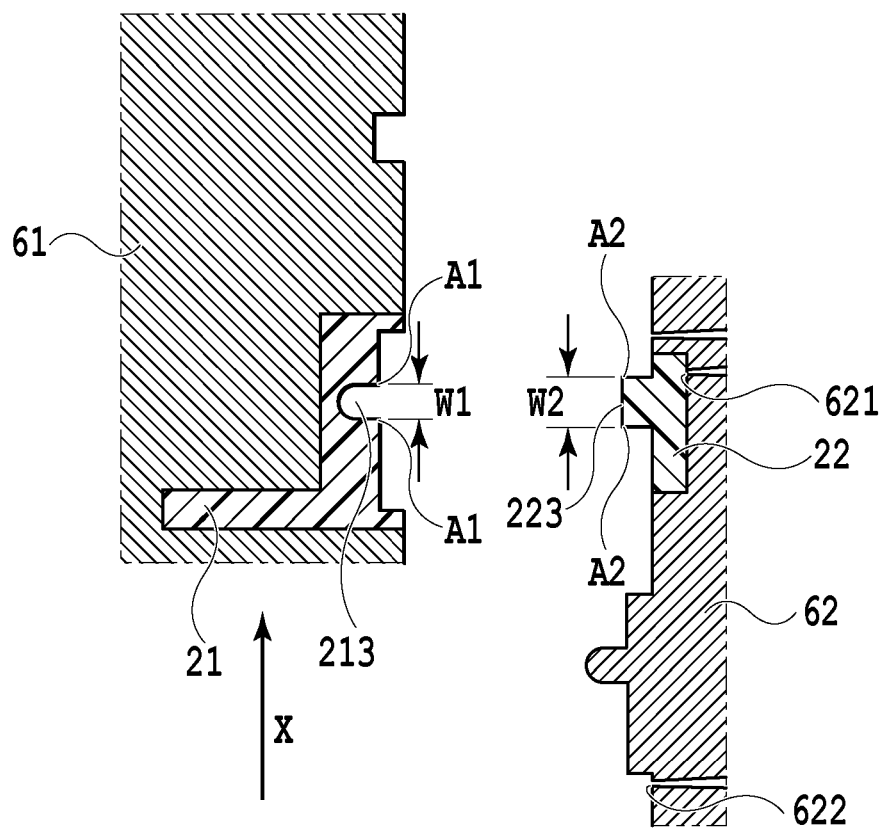
FIG. 2B is a diagram illustrating a second process in manufacturing of a liquid supply member.
Figure 3A:
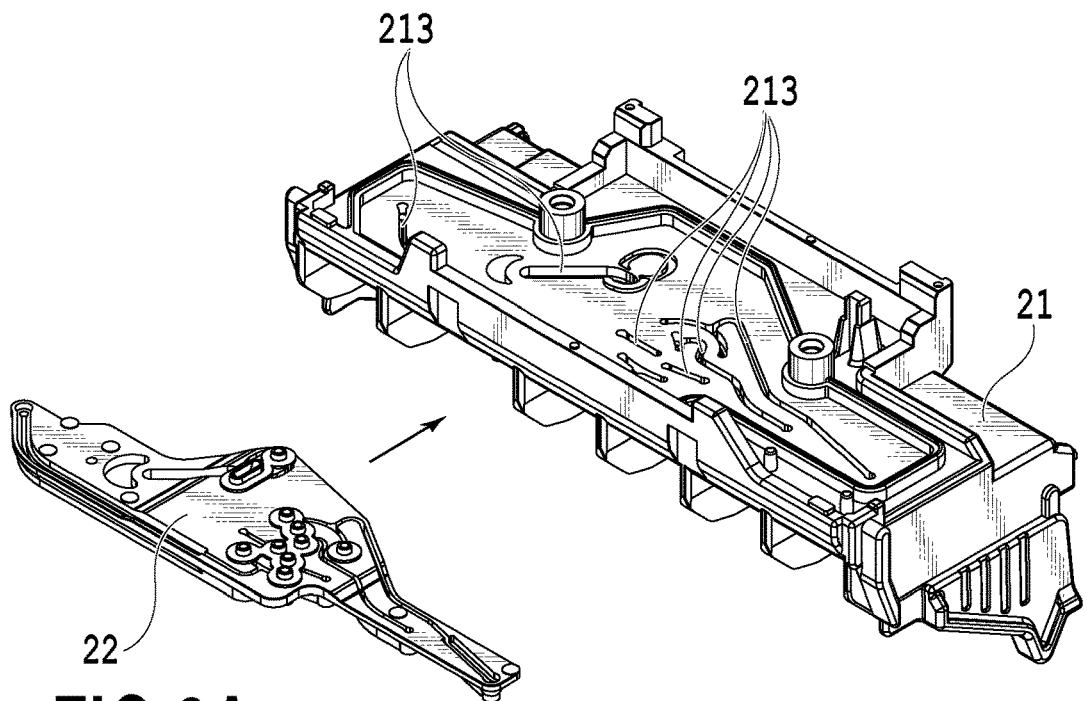
FIG. 3A is a view illustrating a positional relation of molding parts in a first process.
Figure 3B:
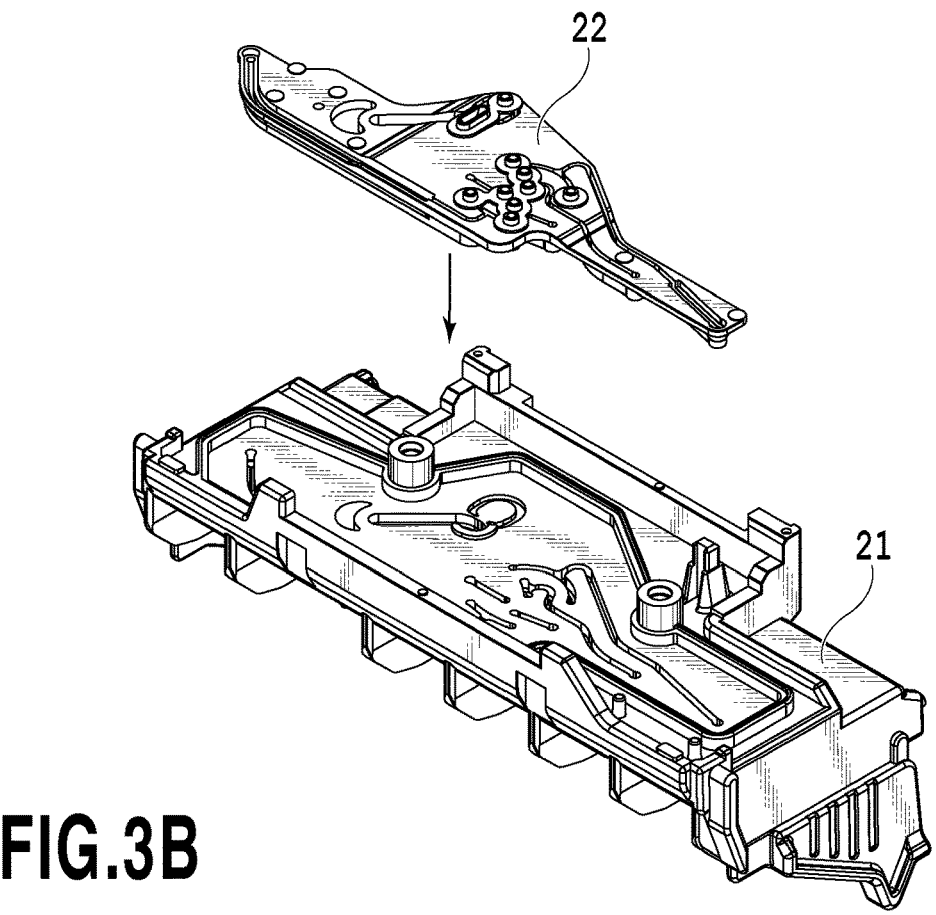
FIG. 3B is a view illustrating a positional relation of molding parts in a second process.

FIGS. 2A and 2B are diagrams illustrating a first process and a second process which are primary molding processes in manufacturing of the liquid supply member 2. Die-slide injection molding is used as the manufacturing method of the liquid supply member 2. FIGS. 2A and 2B are schematic cross-sectional diagrams of a die and a molding part in the first and the second processes during the manufacturing process. In addition, FIGS. 3A and 3B are views illustrating a positional relation of molding parts in the first and the second processes.

In the first process, a first component 21 and a second components 22 constituting the liquid supply member 2 are injection molded inside dies 61 and 62 by a resin material, as illustrated in FIG. 2A. The first component 21 is molded between a first position of the die (first die) 61 and a first position of the die (second die) 62, and the second component 22 is molded between a second position of the die 61 and a second position of the die 62. The resin material for molding the liquid supply member 2 is supplied through gates 621 and 622 provided inside the die 62. The die 61 is slidable along an arrow X direction as illustrated in FIG. 2B. By the use of an unillustrated movement mechanism, the dies 61 and 62 are relatively moved in a die-clamping direction and a die-opening direction, and the die 61 is moved in the arrow X direction and a direction opposite thereto.

The first component 21 is formed with a groove portion (portion forming the liquid supply path) 213 serving as a part of the liquid supply path. The second component 22 is formed with a lid portion 223 which forms the liquid supply path together with the groove portion 213 by closing a lid of the groove portion 213. The lid portion 223 has a width W2 that is larger than a width W1 of the groove portion 213 so as to entirely block an opening of the groove portion 213 (see FIG. 2B). In the present embodiment, a same resin material including filler is used as the molding material of the first component 21 and the second component 22.

In the second process, the dies 61 and 62 are opened as illustrated in FIG. 2B, and then the die 61 holding the first component 21 is caused to slide in the arrow X direction (either the upper die or the lower die is caused to slide). Accordingly, the first component 21 is caused to face the second component 22 held on the die 62. Thereby, a region (first region) A1 around the groove portion 213 and a region (second region) A2 of the lid portion 223 being positioned around the groove portion 213 and protruding from the groove portion 213 in the width direction face each other at a same position, as illustrated in FIG. 3B.

Figure 5A:
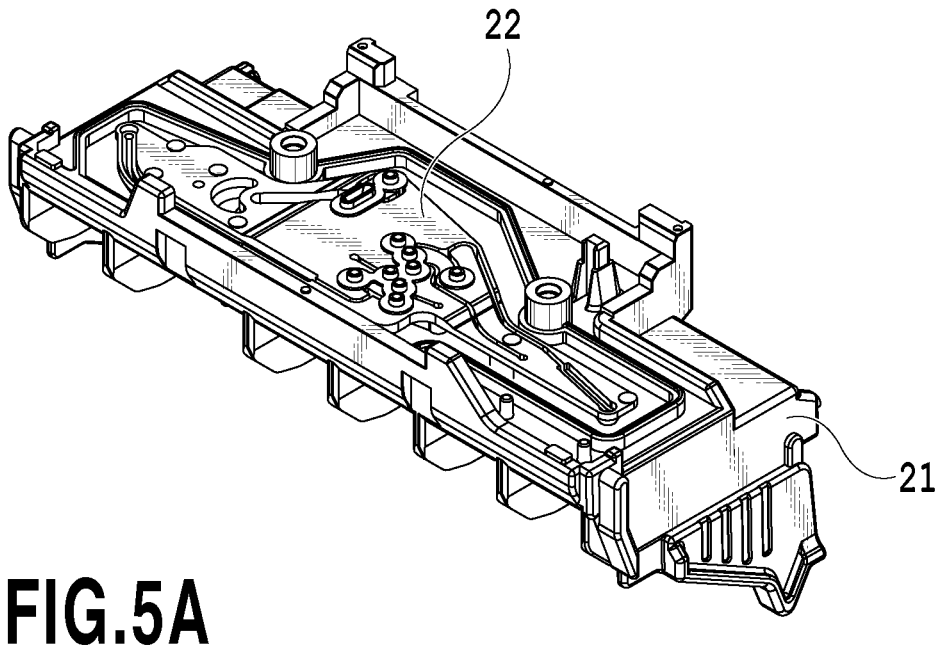
FIG. 5A is an explanatory view of a positional relation of molding parts in a third process.
Figure 5B:
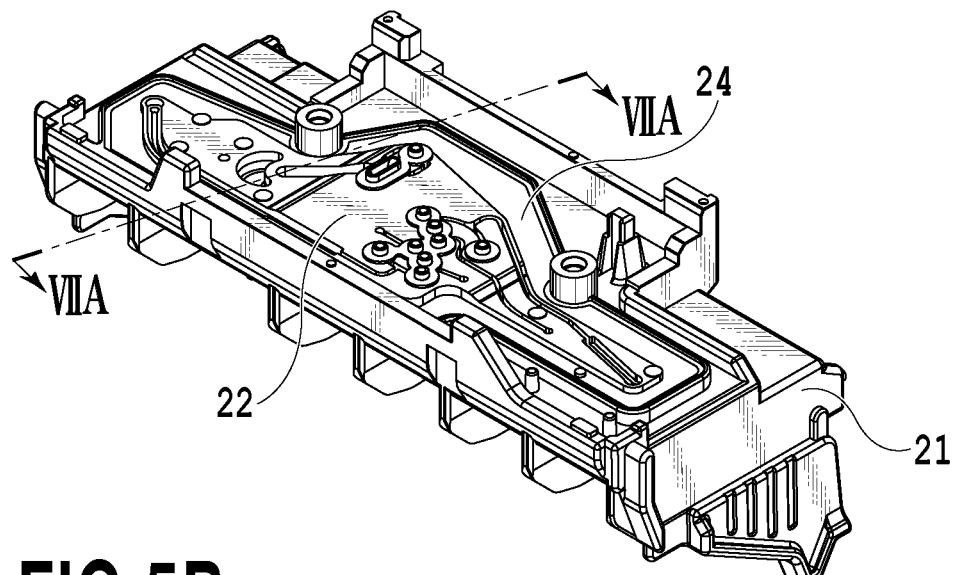
FIG. 5B is an explanatory view of a positional relation of molding parts in a fourth process.

FIGS. 4A to 4C are diagrams illustrating a third process and a fourth process which are a secondary molding process in manufacturing of the liquid supply member 2. FIGS. 4A and 4B are schematic cross-sectional diagrams of a die and a molding part in the third and the fourth processes, and FIG. 4C is a diagram illustrating a cross section of the liquid supply member 2 taken out of the die. In addition, FIGS. 5A and 5B are explanatory views of a positional relation of molding parts in the third and the fourth processes.

In the third process, as illustrated in FIG. 4A, the dies 61 and 62 are clamped again and thus the regions A1 and A2 are made to abut on each other. Accordingly, a liquid supply path 23 is formed in the groove portion 213 closed by the regions A1 and A2, and the first component 21 and the second component 22 are brought into an overlapped state, as illustrated in FIG. 5A.

In the fourth process, as illustrated in FIG. 4B, a molten resin is poured into a region outside the regions A1 and A2 to form a sealing member 24. The molten resin used for forming the sealing member 24 is supplied through a gate 623 provided in the die 62. Solidification by compatibility of the supplied molten resin with the first and the second components causes the first component 21 and the sealing member 24 to be joined and be integrated, also causes the second component 22 and the sealing member 24 to be joined and be integrated, and thus the liquid supply member 2 is constituted, as illustrated in FIGS. 4C and 5B. At this time, a portion of the regions A1 and A2 may also exhibit compatibility due to heat of the molten resin. Subsequently, the liquid supply member 2 constituted by the first component 21, the second component 22, and the sealing member 24 is taken out of the dies 61 and 62 as illustrated in FIG. 4C.

In the present embodiment, the same resin material as that of the first component 21 and the second component 22 is used as the molten resin. The resin material forming the sealing member 24 may be a material of any type which exhibits compatibility with the first component 21 and the second component 22 and may be a material different from that of the first component 21 and the second component 22.

As illustrated in FIG. 1A, with regard to the posture in use of the liquid ejection head 1 having the ejection element unit 3 located therebelow, the groove portion 213 and the lid portion 223 of the liquid supply member 2 extend in a horizontal plane. Namely, the liquid supply path formed by the groove portion 213 and the lid portion 223 includes a portion extending along the horizontal plane, with regard to posture in use of the liquid ejection head 1. In FIG. 3A, the first component 21 is formed with a plurality of the groove portions 213 for forming liquid supply paths corresponding to each of six types of liquids, and the second component 22 is formed with the unillustrated lid portion 223 corresponding to the groove portions 213. In addition, with regard to the posture in use of the liquid ejection head 1, the liquid supply path extends in the vertical direction, in a portion in the vicinity of the connecting portion 4 (see FIG. 1A) and in a portion in the vicinity of the connecting portion with the ejection element unit 3. A bent portion is formed in the connecting portion between a part extending in the vertical direction of the liquid supply path and a part extending along the horizontal plane.

Figure 6:
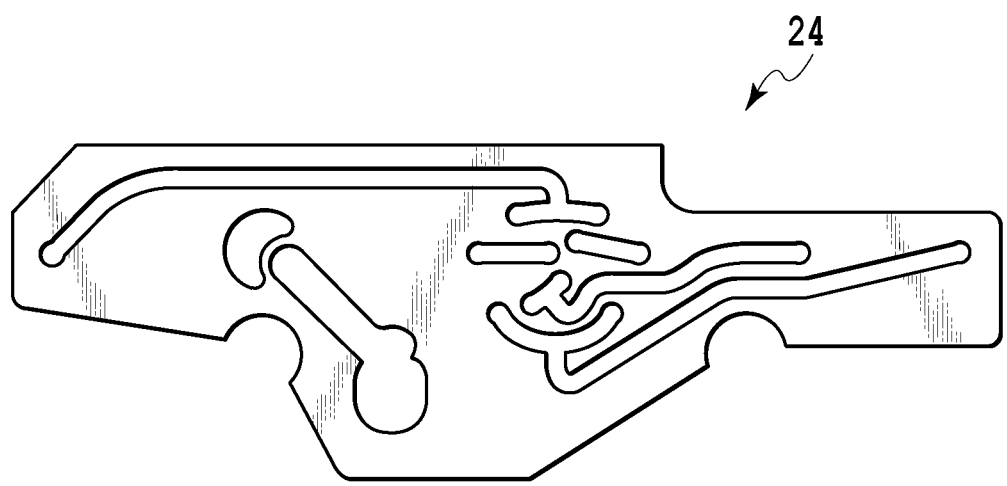
FIG. 6 is a diagram illustrating a projected shape of a flow region of a molten resin.

FIG. 6 is a diagram illustrating a projected shape of the sealing member 24 in the flow region, onto a plane which is perpendicular to opening and closing direction of the die. In order to also reliably fill the part in which the liquid supply paths are densely arranged, a molten resin is caused to flow in an planar (in a horizontal direction) region, and thus the pressure loss is suppressed to be small.

Characteristic Configuration

Subsequently, there will be described the concave portion and the inflow prevention structure portion being a characteristic portion of the invention.

Figure 7A:
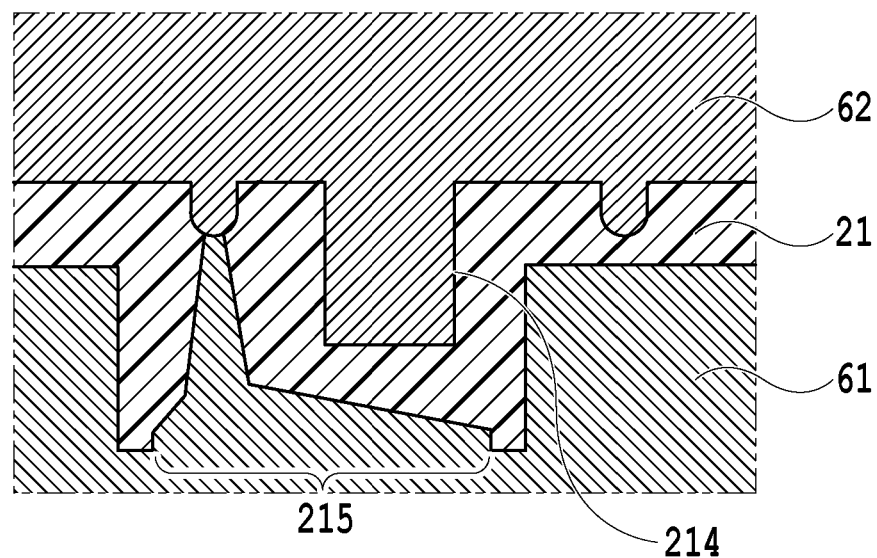
FIG. 7A is a cross-sectional diagram illustrating a concave portion included in a die.
Figure 7B:
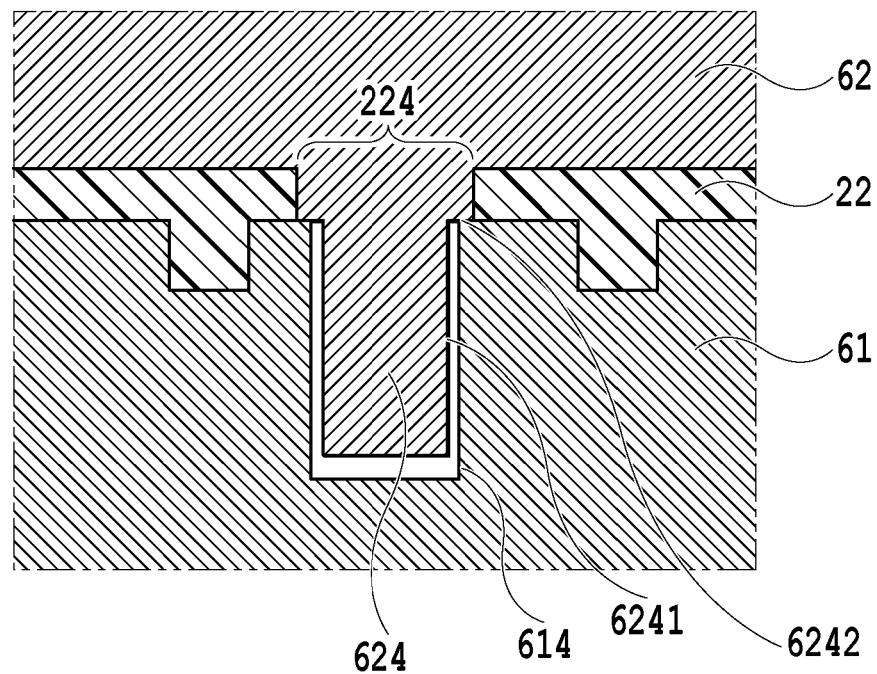
FIG. 7B is a cross-sectional diagram illustrating an inflow prevention structure portion included in a die.
Figure 8A:
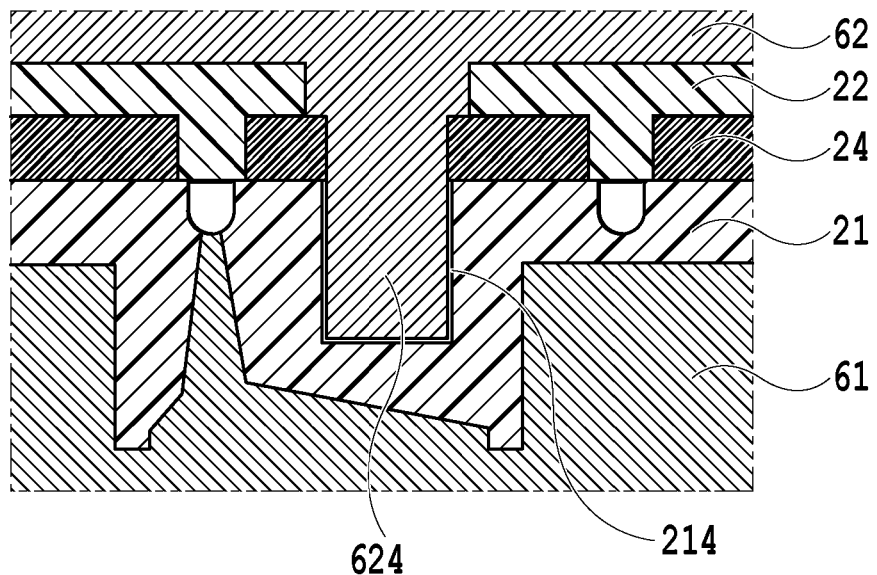
FIG. 8A is a cross-sectional diagram illustrating an inflow prevention structure portion included in a die.
Figure 8B:
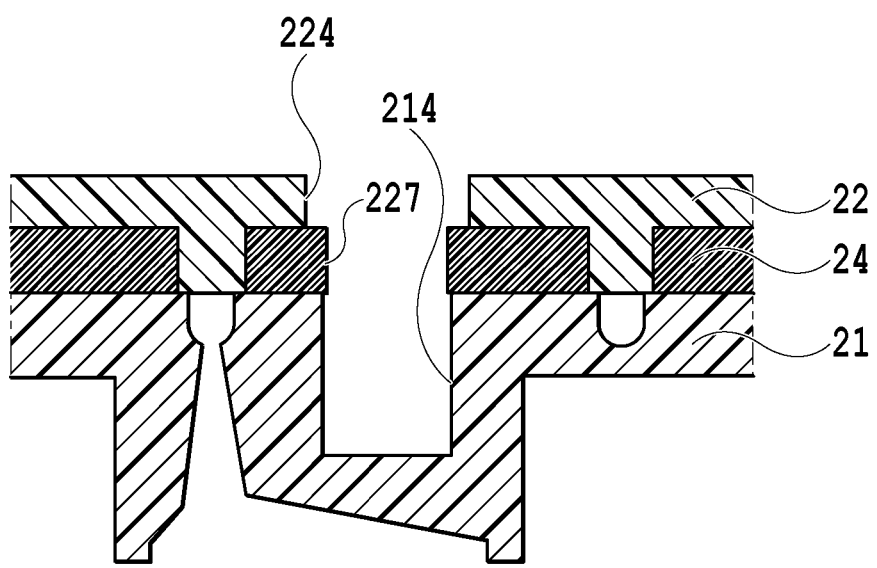
FIG. 8B is a cross-sectional diagram illustrating a concave portion included in a die.

FIGS. 7A, 7B, 8A, and 8B are cross-sectional diagrams illustrating a concave portion and an inflow prevention structure portion included in a die used in manufacturing the liquid supply member 2, in which cross sections of the liquid supply member 2 in respective processes described above (for example, cross section VIIA-VIIA of FIG. 5B). FIG. 7A represents the essential portion of the first component in the first process, and FIG. 7B represents the essential portion of the second component in the first process. In addition, FIG. 8A represents a state in which a molten resin is filled in the fourth process, and FIG. 8B represents a state in which the member is taken out of a die.

Hereinafter, the first component 21 will be described by the use of FIG. 7A. In the present embodiment, a concave portion 214 is provided in a partial region of the back side of an opening portion 215 forming a joint portion 4 of the first component 21. In an assembly process of the liquid ejection head 1 after having molded the liquid supply member 2, a filter for removing dust is attached to the opening portion 215, thereby forming the joint portion 4. The opening portion 215 of the first component in the joint portion 4 is required to secure a sufficient opening area so that sufficient liquid can be supplied also in consideration of the pressure loss due to the filter. In order to prevent a sink in the first component to thereby obtain a stable shape while securing the required opening area of the opening portion 215, the concave portion 214 being a thinned portion, is provided on the back side of the joint portion.

In the present embodiment, one of the six types of liquids is a type of liquid supplied to the printing element substrate 6 which supplies a relatively high flow rate. Since the liquid supplied to the printing element substrate 6 may require a higher flow rate per hour than other types of liquids, the opening area of the joint portion corresponding to the liquid is made larger than the opening area of joint portions corresponding to other types of liquids. In the present embodiment, the concave portion 214 is provided on the back side of the joint portion having a large opening area and corresponding to the liquid with a high flow rate. There is provided an inclination (extraction taper) for facilitating extraction of the die after molding, on the side surface of the concave portion 214.

Next, the second component 22 and a die for molding the second component 22 will be described by the use of FIG. 7B. At a second position of the second die 62 for molding the second component, an inflow prevention structure portion 624 is provided at a position corresponding to the concave portion 214 of the first component 21 in the third process. Along with this, the second component 22 is provided with an opening 224 in which the inflow prevention structure portion 624 is inserted in the third process. In addition, the first die 61 is provided with an evacuation portion 614 at a position corresponding to the inflow prevention structure portion 624. The evacuation portion 614 has a sufficient clearance in order to prevent engagement with a side wall 6241 of the inflow prevention structure portion 624. The shape of the opening 224 of the second component 22 is defined by abutment of the periphery of an opening of the evacuation portion 614 on a step portion 6242 provided at the base of the inflow prevention structure portion 624. Accordingly, the opening 224 of the second component has a shape expanding outward by a portion for the step portion 6242, relative to the shape of the inflow prevention structure portion. In the present embodiment, the step portion 6242 is assumed to be a step higher than the side wall 6241 by 0.5 mm.

Subsequently, in the third process, the inflow prevention structure portion 624 enters, with a minute clearance, the concave portion 214 of the first component, and in the fourth process, a molten resin is poured into a peripheral region of a liquid supply path-forming portion (see FIG. 8A). At this time, the concave portion 214 is filled with the inflow prevention structure portion 624, thereby preventing inflow of the molten resin. Since the molten resin does not flow into the concave portion 214, molten resin is filled by a flow in an approximately horizontal direction. The molded product taken out of the die after the fourth process is formed with a concave shape leading to the opening 224 of the second component 22 from the concave portion 214 (see FIG. 8B). In the present embodiment, as illustrated in FIG. 8B, the opening diameter of an opening 227 formed by a molten resin 24 is smaller than the opening diameter of the opening 224 of the second component 22. Similarly, the opening diameter of the opening portion of the concave portion 214 of the first component 21 is smaller than the opening diameter of the opening 224 of the second component 22. Such a configuration further allows the inflow prevention structure portion 624 of the die 62 to prevent inflow of the molten resin 24 into the concave portion 214.

Figure 9A:
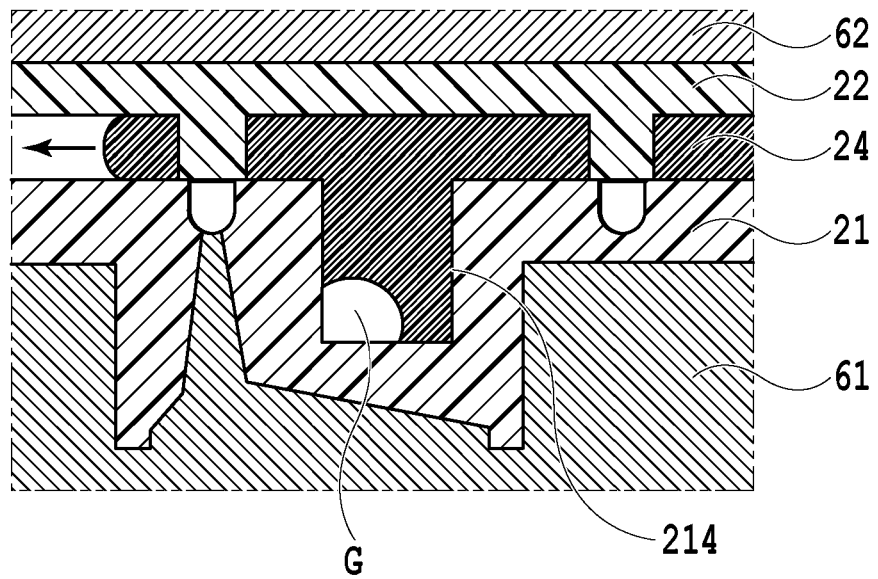
FIG. 9A is a diagram illustrating a cross section in the course of performing molding by the use of a die without an inflow prevention structure portion provided therein.
Figure 9B:
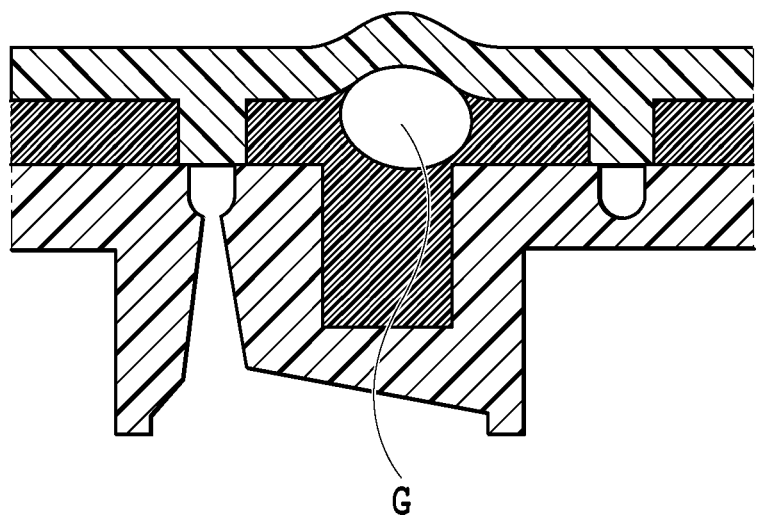
FIG. 9B is a diagram illustrating a cross section in the course of performing molding by the use of a die without an inflow prevention structure portion provided therein.

FIGS. 9A and 9B are diagrams illustrating cross sections in the course of molding a liquid supply member in the concave portion 214 by the use of a die without an inflow prevention structure portion provided therein. Since an inflow prevention structure portion is not provided in the process in which a molten resin flows in a direction of an arrow in FIG. 9A (horizontal direction), inflow of the molten resin into the concave portion 214 causes a flow of the molten resin in the vertical direction. At this time, the concave portion 214 may not be completely filled due to air having entered together with the molten resin, gas having been generated from the resin (hereinafter, referred to as air bubble G) or the like, thereby leaving the air bubble G in the concave portion 214. In a region surrounded by the first component and the second component, the molten resin is less likely to be cooled down and is in a state of maintaining fluidity for a while after the filling, and thus the remaining air bubble G may move inside the molten resin. In a case where the air bubble G moves closer to the liquid supply path as illustrated in FIG. 9B, there is a concern that the reliability of the sealing part in the liquid supply path may decrease depending on the use environment after curing of the molten resin.

In addition, although the air bubble G is in a compressed state in the fourth process by die-lamping pressure and resin pressure, a part of the pressure is released by opening the die, whereby the volume expands. At this time, the first component 21 and the second component 22 are brought into an easily deformable state due to heat of the molten resin, and thus it is likely that the air bubble G expands and the first and the second components are deformed. Accordingly, there is a fear that the liquid supply path may deform, which leads to liquid supply failure, or the external shape of the liquid supply member may deform, which leads to a decreased precision of the positional relation with the other parts.

In view of the aforementioned problems, the configuration of the present invention having an inflow prevention structure portion results in an approximately horizontal flow of the molten resin, not a complicated flow including a perpendicular flow. Therefore, it becomes possible to reduce occurrence of remaining air bubbles and to provide a liquid supply path excellent in superior sealing reliability and shape stability, and a liquid supply member excellent in shape stability.

Figure 10:
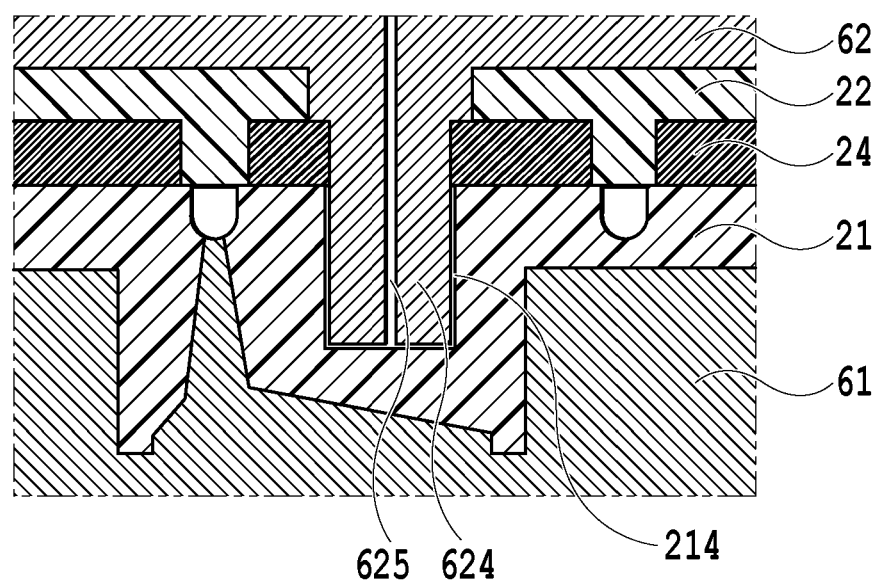
FIG. 10 is a diagram illustrating a modified example.

FIG. 10 is a diagram illustrating a modified example of the present embodiment. Instead of having a minute clearance between the inflow prevention structure portion 624 and the concave portion 214, the modified example of the present embodiment may provide an inclination on the wall surfaces of the inflow prevention structure portion 624 and the concave portion 214 to thereby cause the wall surfaces to press against each other. In addition, as illustrated in FIG. 10, there may be provided a gas vent 625 for removing gas from an inside of the concave portion, in the inflow prevention structure portion.

As thus described, in the manufacturing process of the liquid supply member, a molten resin is prevented from flowing into the concave portion of apart other than the liquid supply flow path in the liquid supply member. Accordingly, there has been able to be realized a manufacturing method of a liquid supply member capable of suppressing decrease in sealing property of the liquid supply path and deformation of the liquid supply path or the external shape.

Second Embodiment

Hereinafter, a second embodiment of the present invention will be described with reference to the drawings. Note that, since the basic configuration of the present embodiment is similar to that of the first embodiment, only characteristic configuration will be described below.

Figure 11A:
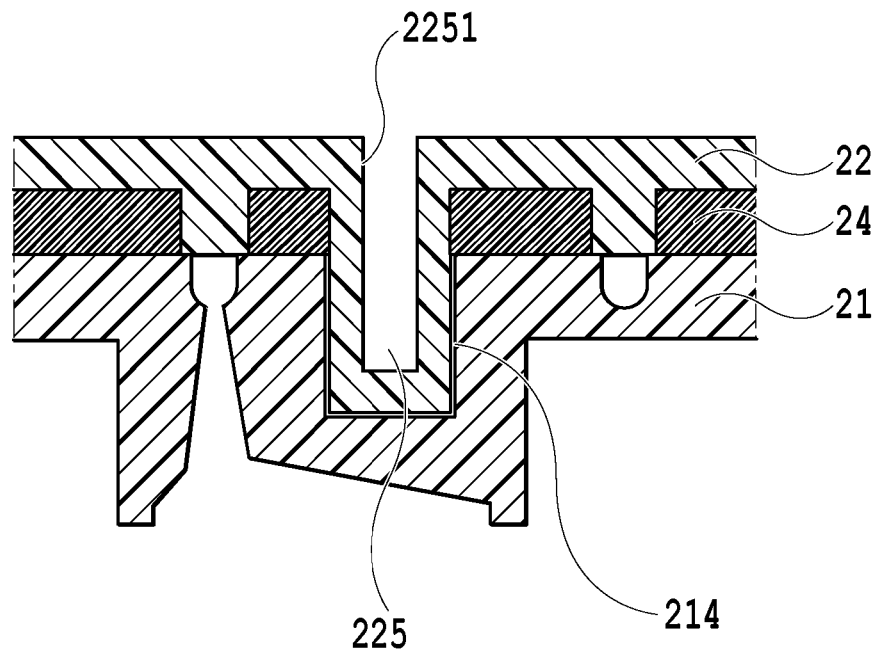
FIG. 11A is a cross-sectional diagram illustrating a concave portion included in a die.
Figure 11B:
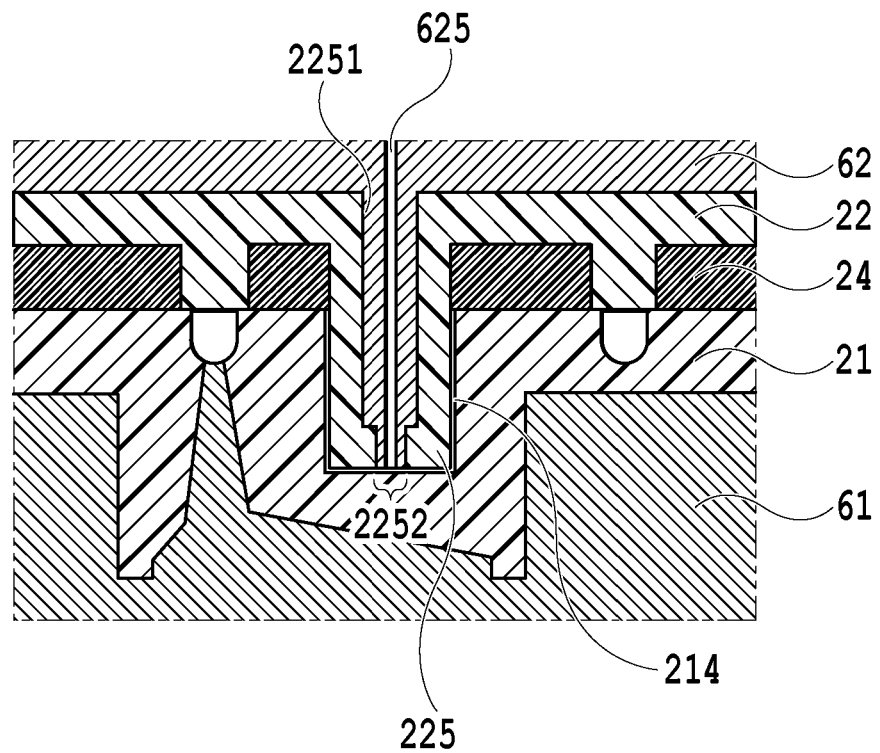
FIG. 11B is a cross-sectional diagram illustrating an inflow prevention structure portion included in a die.

FIG. 11A is a cross-sectional diagram illustrating a state in which the dies 61 and 62 are separated after manufacturing of the liquid supply member 2 in the present embodiment, and FIG. 11B is a cross-sectional diagram illustrating a state when molding the liquid supply member 2 by the use of the dies 61 and 62. The present embodiment has a configuration in which the inflow prevention structure portion is formed by the use of a part of the second component 22, and, in the third process, the inflow prevention structure portion 225 is made to enter the concave portion 214 of the first component 21.

Accordingly, it is possible to regulate inflow of a molten resin into the concave portion 214, and reduce the possibility of decreased sealing property of the liquid supply path or deformation of members due to a remaining air bubble, similarly to the first embodiment.

Note that, although the inflow prevention structure portion is thick and thus a thin-wall portion 2251 is provided in the present embodiment, the thin-wall portion 2251 needs not be provided in a case where there is no problem with moldability of the inflow prevention structure portion. In addition, instead of having a minute clearance between the inflow prevention structure portion 225 and the concave portion 214, the present embodiment may also provide an inclination on the wall surfaces of the inflow prevention structure portion 225 and the concave portion 214 to thereby cause the wall surfaces to press against each other, similarly to the first embodiment. Additionally, as illustrated in FIG. 11B, a through-hole 2252 from the thin-wall portion 2251 may be provided on the tip of the inflow prevention structure portion 225, and the die holding the thin-wall portion may be provided with the gas vent 625.

As thus described, in the manufacturing process of the liquid supply member, a molten resin is prevented from flowing into a concave portion of a part other than the liquid supply flow path in the liquid supply member, by the use of a part of the second component. Accordingly, there has been able to be realized a manufacturing method of a liquid supply member capable of suppressing decrease in sealing property of the liquid supply path and deformation of the liquid supply path or the external shape.

Third Embodiment

Hereinafter, a third embodiment of the present invention will be described with reference to the drawings. Note that, since the basic configuration of the present embodiment is similar to that of the first embodiment, only characteristic configuration will be described below.

Figure 12:
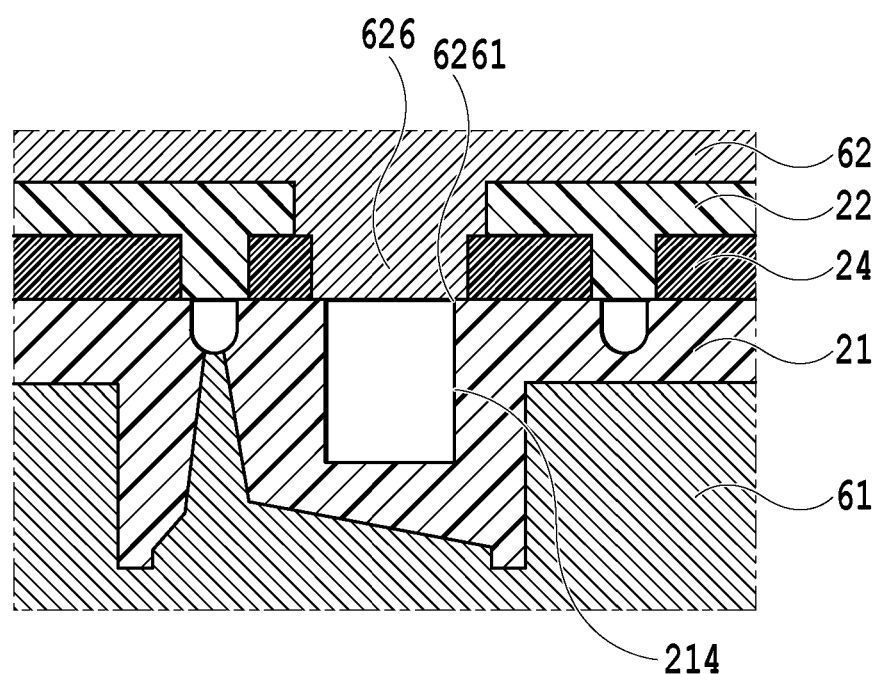
FIG. 12 is a cross-sectional diagram illustrating a concave portion and an inflow prevention structure portion included in a die.

FIG. 12 is a cross-sectional diagram illustrating a concave portion and an inflow prevention structure portion in manufacturing the liquid supply member 2 in the present embodiment. Although the present embodiment is similar to the first embodiment in that the second die 62 includes an inflow prevention structure portion 626, the outer peripheral portion of a bottom surface 6261 of the inflow prevention structure portion is pressed against the outer peripheral portion of the opening portion of the concave portion 214, without making the inflow prevention structure portion 626 enter the concave portion 214. Accordingly, the concave portion 214 is blocked, thereby preventing inflow of a molten resin.

As described above, in the manufacturing process of the liquid supply member, a molten resin is prevented from flowing into the concave portion by blocking, with a die, the opening portion of the concave portion of a part other than the liquid supply flow path in the liquid supply member. Accordingly, there has been able to be realized a manufacturing method of a liquid supply member capable of suppressing decrease in sealing property of the liquid supply path and deformation of the liquid supply path or the external shape.

Fourth Embodiment

Hereinafter, a fourth embodiment of the present invention will be described with reference to the drawings. Note that, since the basic configuration of the present embodiment is similar to that of the first embodiment, only characteristic configuration will be described below.

Figure 13:
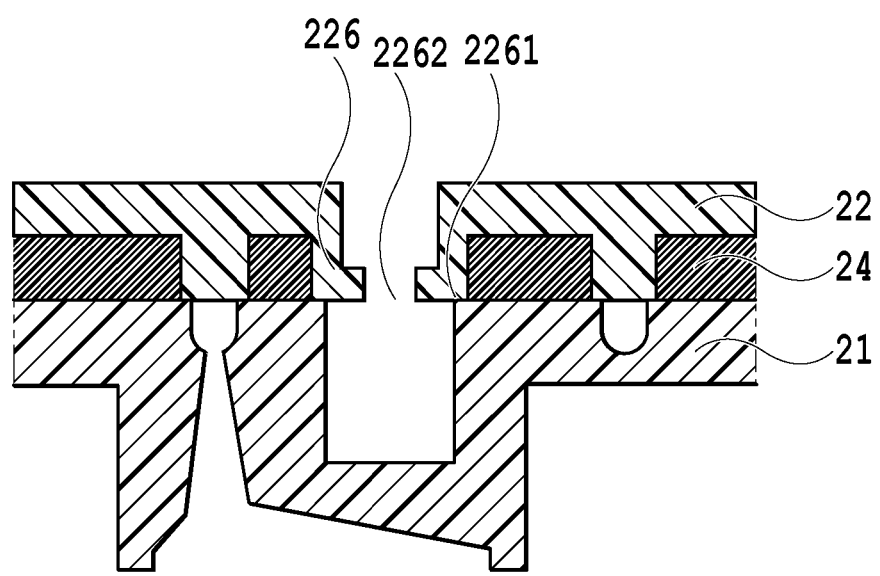
FIG. 13 is a cross-sectional diagram illustrating the concave portion and an inflow prevention structure portion included in a die.

FIG. 13 is a cross-sectional diagram illustrating a concave portion and an inflow prevention structure portion included in a die used in manufacturing the liquid supply member 2 in the present embodiment. Although the present embodiment is similar to the second embodiment in that the inflow prevention structure portion 226 is formed by a part of the second component 22, the outer peripheral portion of a bottom surface 2261 of the inflow prevention structure portion is pressed against the outer periphery of the opening portion of the concave portion 214, without making the inflow prevention structure portion 226 enter the concave portion 214. Accordingly, the concave portion 214 is blocked, thereby preventing inflow of molten resin.

Note that, although the region defined by the concave portion 214 and the bottom surface 2261 of the inflow prevention structure portion may be a closed space, a communication port 2262 may be provided in a case where dew condensation or expansion of gas in the region caused by a change in the external environment has a possibility of exerting an adverse effect on the function or reliability of the liquid supply member.

As described above, in the manufacturing process of the liquid supply member, a molten resin is prevented from flowing into the concave portion by blocking the opening portion of the concave portion of a part other than the liquid supply flow path in the liquid supply member, through the use of a part of the second component Accordingly, there has been able to be realized a manufacturing method of a liquid supply member capable of suppressing decrease in sealing property of the liquid supply path and deformation of the liquid supply path or the external shape.

Other Embodiments

Although, each of the aforementioned embodiments employ a configuration in which a concave portion is provided in a member having a groove portion forming a liquid supply path, and a member having a lid portion forming the liquid supply path or a die holding the member is provided with an inflow prevention structure portion, a reverse configuration may also be employed. Namely, in a case where a member having a lid portion forming a liquid supply path has a concave portion, it is sufficient that the member having the groove portion forming the liquid supply path or the die holding the member is provided with the inflow prevention structure portion.

In addition, although the concave portion included in the first component is provided for the purpose of thinning, the present invention is also effective in a case where the concave portion is provided for another purpose. For example, it is sufficient that the inflow prevention structure portion is provided in a similar way even in a case where a concave portion is provided for the purpose of weight saving, or reduction in the amount of materials used, a case where a concave portion is provided for the purpose of changing the manner of temperature rise of the liquid supply member at the time of use, or the like.

In addition, the target of manufacturing in the present invention is not limited only to a liquid supply member included in a liquid ejection head, and any liquid supply member formed with various types of liquid supply paths therein serves as a target.

In each of the aforementioned embodiments, although there has been described the form of preventing a molten resin from flowing into the concave portion 214, the inflow of a small amount of a molten resin into the concave portion is acceptable in the present invention. Even in a case where the molten resin flows into the concave portion 214, it is sufficient that air bubbles in the concave portion 214 are not sealed by the molten resin. Namely, even in a case where the molten resin has flowed in, air bubbles do not expand if the inside of the concave portion 214 is in a communication state with the outside by units such as the communication port 2262 illustrated in FIG. 13, and thus a certain amount of inflow of the molten resin is acceptable.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-149862 filed Jul. 29, 2016, which is hereby incorporated by reference wherein in its entirety.

What is claimed is:

1. A manufacturing method of a liquid supply member, the method comprising:
   a primary molding process of molding, at different positions in a same die, a first member including a concave portion and a groove portion that causes liquid to flow such that a first part of the die is inside the concave portion, and a second member having a lid portion capable of closing a lid of the groove portion in combination with the first member, and an opening such that a second part of the die, which is different from the first part of the die, is inside the opening;
   a mold opening process of pulling out the first part of the die from the inside of the concave portion of the first member; and
   a secondary molding process of connecting the first member and the second member with a molten resin by relatively moving a first pattern and a second pattern of the die to thereby cause the first member and the second member to face each other and by molding the first member and the second member in an overlapped manner,
   wherein the secondary molding process includes an inflow prevention process of preventing inflow of the molten resin into the concave portion provided at a position different from the groove portion in the first member by inserting the second part of the die into the concave portion so that the molten resin contacts the second part of the die.

2. The manufacturing method according to claim 1, wherein the second part of the die is provided with a gas vent for removing gas from the inside of the concave portion.

3. The manufacturing method according to claim 1, wherein the secondary molding process inserts the second part of the die into the concave portion of the first member, via the opening of the second member.

4. The manufacturing method according to claim 3, wherein an opening diameter of the opening is larger than an opening diameter of the concave portion, in the secondary molding process.

5. The manufacturing method according to claim 3, wherein, in the secondary molding process, an opening diameter of an opening formed by the molten resin provided between the opening of the second member and the concave portion of the first member is smaller than an opening diameter of the opening of the second member.

* * * * *